Oct. 14, 1969  SETSUYA ISSHIKI  3,472,692
BUTYL RUBBER-INSULATED ELECTRIC CABLE AND METHOD
OF MANUFACTURE THEREOF
Filed Feb. 9, 1967
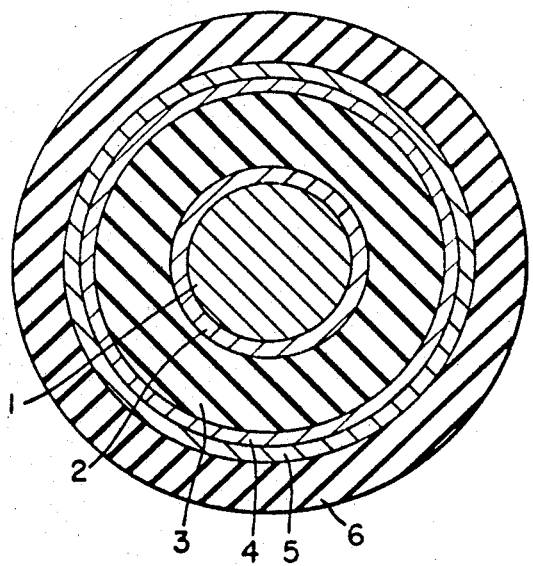
Setsuya Isshiki,
INVENTOR
BY Wenderoth,
and Ponack ATTORNEYS United States Patent Office 3,472,692
Patented Oct. 14, 1969

3,472,692
BUTYL RUBBER-INSULATED ELECTRIC CABLE AND METHOD OF MANUFACTURE THEREOF
Setsuya Isshiki, Funabashi-shi, Japan, assignor to The Fujikura Cable Works Limited, Fukagawa Heikyu-cho, Koto-ku, Tokyo, Japan
Filed Feb. 9, 1967, Ser. No. 614,878
Claims priority, application Japan, Apr. 6, 1966, 41/21,191
Int. Cl. B44d 1/42, 1/18
U.S. Cl. 117—218       4 Claims

ABSTRACT OF THE DISCLOSURE

Electric cable, the butyl rubber insulation of which comprises 70–150% by weight, based on the butyl rubber, of finely divided $CaCO_3$ surface-treated with hydrophobic fatty acid or salt thereof, is characterized by enhanced resistance to breakdown of dielectric strength. The insulation composition is applied directly to the cable (low-capacity cable) or with interposed conventional semi-conducting layer (high-capacity cable). An exterior protective coating of PVC, chloroprene or lead sheathing is also provided.

---

This invention relates to butyl rubber-insulated electric cables.

Butyl rubber is known as an insulating material having excellent electric properties, and is used for insulating electric cables which are required to be especially flexible.

In the past, the butyl rubber compositons which were used in so-called butyl rubber electric cables (i.e. cables employing this type of rubber for insulation) have been those in which fillers such as calcium carbonate, calcined clay or talc have been incorporated along with other compounding agents such as carbon black and vulcanizing agents. Usually, after the ingredients had been thoroughly kneaded together, the outside of the conductor was coated with the compounded rubber composition by either the extrusion or the covering method, after which the covered conductor was subjected to steam vulcanization.

It is however known that, while the conventional butyl rubber electric cables have at first a relatively high voltage resistance (dielectric strength), when used over a prolonged period of time, this decreases as a result of water absorption so that at times dielectric breakdown occurs.

It is therefore a primary object of this invention to provide an electric cable of good dielectric strength which can be used over a prolonged period of time without dielectric breakdown trouble.

In one aspect the invention comprises butyl rubber compositions which contain as filler 70 to 150 percent, based on the weight of the butyl rubber, of finely divided calcium carbonate whose surface has been treated with a hydrophobic fatty acid or a salt of such an acid so as to form a coating of the said acid or salt thereon. (Proportions are by weight.) The invention comprises also the production of cables insulated with such compositions, and the cables themselves.

The butyl rubber which is generally and preferably used is a copolymer of 97–99% of isobutylene with 1–3% of isoprene, and is well-known. It is distinguished by its superior resistance to ozone and water as well as its electric properties.

The amount of the treated calcium carbonate filler is important. When the amount compounded is less than 70%, the cost of the insulating material becomes high and also the fabrication of the insulated cable becomes difficult on account of the increased shrinkage that occurs in the composition in the coating and vulcanizing operations. On the other hand, when the amount exceeds 150%, e.g., is between 150% and 200%, the viscosity of the rubber compositon rises and this again makes the fabrication of the cable difficult; moreover the dielectric loss tangent (tan $\delta$) of the insulating layer increases.

The hydrophobic fatty acids are the higher aliphatic carboxylic acids, and preferably the saturated and unsaturated higher aliphatic monocarboxylic acids. Of these fatty acids, rosin acids, palmitic acid, stearic acid and oleic acid are preferred in view of their ready availability. Especially the sodium, potassium and calcium salts can be used.

While any calcium carbonate, whether light or heavy, can be used, the electric insulating properties and weather-ability of the butyl rubber composition are best when the particle diameter is not greater than 200 m$\mu$ after the surface treatment with the fatty acids or salts thereof. To effect the treatment, a customary procedure for forming a coating on the surface of a solid can be employed. For instance, the coating can be formed by immersing finely divided heavy calcium carbonate in a melt or a solution of the calcium salt of a fatty acid. Alternatively, a treated light calcium carbonate can be obtained by adding a fatty acid or a fatty acid salt, say sodium stearate, to milk of lime, and blowing carbon dioxide into the mixture. It is particularly preferred that the treated calcium carbonate finally has the fatty acid in the form of its calcium salt. The amount of the fatty acid or salt on the surface of the calcium carbonate is preferably between 0.05% and 5.0 based on the calcium carbonate.

The surface-treated calcium carbonate can be compounded with the butyl rubber according to known prescriptions, along with such other compounding ingredients as vulcanizing agents, vulcanizing accelerators, softeners and anti-oxidants, for example. The compounding can be effected in the usual ways, e.g. by kneading on a rubber mill or in a Banbury mixer.

The compounded rubber can be coated about the outside of the conductor by either the extrusion or covering method, and then wrapped with a cotton tape and vulcanized.

In this case it is common practice to apply the coating directly to the conductor in the case of a low-capacity cable, but with an intermediate semiconducting layer such as carbon paper or semiconductive rubber placed directly next to the conductor in the case of a large-capacity cable.

The insulated-core wire so obtained is then usually provided on its exterior with a protective covering for example polyvinyl chloride, chloroprene or lead sheathing, directly in the case of a single core cable, but after twisting together with other interposing materials in the case of a multicore cable. In the case of large-capacity cables, the foregoing protective covering is provided to the exterior of the cable, which has a metallic shielding tape, e.g., of copper or brass, applied about each individual insulated core wire or about an assembly of core wires which have been twisted together.

The invention is illustrated in the accompanying drawing, in which the figure is a sectional view showing the structure of a butyl rubber high voltage single-core cable.

Referring now to the drawing, a conductor 1 is surrounded by a semiconductive layer 2 and a butyl rubber insulating layer 3 in which has been compounded as a filler calcium carbonate whose surface has been treated with a hydrophobic fatty acid. Outside this is a semiconductive layer 4, a shielding tape layer 5, and a chloroprene sheath 6. The insulating layer 3 may if desired be a composite layer consisting of one or more layers of the aforesaid butyl rubber composition with layers of other synthetic rubber compositions; such an insulating layer has greater toughness and water-resistance and is therefore an electrically superior construction.

The butyl rubber compositions of the invention are markedly superior in their electric properties to the conventional butyl rubber compositions containing as filler either calcined clay or talc; in particular they provide a much greater resistance to breakdown, since the decrease in dielectric strength is small during prolonged use, even in water.

It has been known heretofore to use as insulation materials for electric cables butyl rubber in which have been compounded various fillers. However, the importance of the effects of the fillers on the dielectric breakdown of electric cables during prolonged use has not been fully appreciated, and it was merely considered desirable to use rubber having good electric properties and fillers having likewise good electric properties. Again, since it was well-known that the insulating resistance of the rubber composition would decrease if a hygroscopic filler were used, it was generally considered desirable to use a finely divided filler having low hygroscopicity.

While I do not wish to be held to any particular theory, I believe that the electric properties of the rubber composition are largely determined by the presence or absence of chain formations in the filler. Thus, even though the filler itself might be hygroscopic, so long as chains are not formed no decrease in the electric properties of the rubber is brought about even under hygroscopic conditions. The efficiency of the particular coated calcium carbonate fillers of the invention seems to be connected with the fact that when they are used chain formation is at a minimum.

By way of comparison, the electric properties of the filler used according to this invention and those of the fillers which have been used heretofore in butyl rubber insulating materials are shown in Table I.

TABLE I.—ELECTRIC PROPERTIES OF FILLERS PER SE

| Filler | Tan δ Percent | Volume resistivity (Ωcm.) |
| --- | --- | --- |
| Calcium carbonate surface-treated with a hydrophobic fatty acid | 4.3 | $8.7 \times 10^{14}$ |
| Clay | Above 10 | $1.1 \times 10^{12}$ |
| Diatomaceous earth | do | $1.5 \times 10^{11}$ |
| Talc | do | $5.6 \times 10^{12}$ |
| Light calcium carbonate | do | $1.0 \times 10^{11}$ |
| Hydrous silicic acid | do | $1.0 \times 10^{11}$ |
| Magnesia | do | $5.0 \times 10^{10}$ |

It is apparent from the table that, while the volume resistivity of these fillers is far less than $10^{18}$, that of butyl rubber itself, the surface-treated calcium carbonate of the invention is markedly superior in volume resistivity and tan δ to the fillers, such as clay and talc, which were hitherto used in the art. Further, the volume resistivity of the surface-treated calcium carbonate is especially high, as compared with untreated light calcium carbonate, being more than 1000 times as high.

The changes in electric properties as indicated by the value of tan δ (%) obtained with varying amounts of these fillers are shown in Table II.

TABLE II.—TAN δ OF BUTYL RUBBER COMPOUNDS WITH FILLERS

| Filler | Amount compounded (weight percent based on butyl rubber) | | |
| --- | --- | --- | --- |
| | 50 | 100 | 150 |
| Calcium carbonate surface-treated with a hydrophobic fatty acid | 0.50 | 0.60 | 0.80 |
| Calcined clay | 0.60 | 1.00 | 2.15 |
| Talc | 0.70 | <10 | <10 |
| Light calcium carbonate | 0.55 | 1.00 | 5.00 |

It is apparent from Table II that in the case of the butyl rubber compositions of the invention no substantial decrease occurs in the electric properties even though the filler content reaches 150% by weight, whereas in butyl rubbers containing conventional fillers a similar filler content causes a considerable decrease in the electric properties.

The electric properties of the same butyl rubber compositions after they have been exposed for a long time to hygroscopic conditions are shown (as the tan δ value) in Table III.

TABLE III.—TAN δ OF BUTYL RUBBER COMPOSITIONS AFTER PROLONGED EXPOSURE TO HYGROSCOPIC CONDITIONS

| Filler | Amount compounded (weight percent based on butyl rubber) | | |
| --- | --- | --- | --- |
| | 50 | 100 | 150 |
| Calcium carbonate surface-treated with a hydrophobic fatty acid | 0.68 | 0.80 | 0.85 |
| Calcined clay | 1.50 | <10 | <10 |
| Talc | <10 | <10 | <10 |
| Light calcium carbonate | <10 | <10 | <10 |

It is apparent that in the butyl rubber composition containing calcium carbonate whose surface has been treated according to this invention there was hardly any decrease in the electric properties even after long exposure to hygroscopic conditions; under the same conditions the electric properties of insulating materials made of the conventional butyl rubber compositions deteriorated badly. This is in spite of the fact that the treated calcium carbonate of the invention is considerably more hygroscopic.

It is a further advantage of the invention that the surface-treated calcium carbonate is easily dispersible uniformly in butyl rubber. Moreover, the surface-treated calcium carbonate which has been prepared, for instance, by blowing carbon dioxide into milk of lime containing a fatty acid such as stearic acid is in the form of fine particles having a spheroidal configuration and a particle size below 200 $m/\mu$. This configuration makes it more readily dispersible than light calcium carbonate which has a needle-like crystalline configuration, or heavy calcium carbonate which has a flake-like configuration.

As an example of the improvement effected by the invention, it may be said that when an electric cable which has been insulated with butyl rubber containing as its filler either calcined clay or talc is used for supplying a 3-phase alternating current at 600 volts, frequent dielectric breakdowns are noted in it terminal portions after prolonged use. In contrast, it has been confirmed that an electric cable of the invention can be used safely for prolonged periods of time under identical conditions without any trouble at all from dielectric breakdown.

The following examples illustrate the invention. Parts are by weight.

EXAMPLE I

Rubber compounds having the following compositions were prepared.

| | Compounding ingredients | | | | | |
| --- | --- | --- | --- | --- | --- | --- |
| Compound | Butyl rubber | Zinc white | Paraffin | Filler | p-Quinone dioxime | Red lead |
| A | 100 | 5 | 2 | Stearic acid surface-treated calcium carbonate, 70. | 3 | 2 |
| B | 100 | 5 | 2 | Stearic acid surface-treated calcium carbonate, 150. | 3 | 2 |
| C | 100 | 5 | 2 | Light calcium carbonate, 100. | 3 | 2 |
| D | 100 | 5 | 2 | Heavy calcium carbonate, 100. | 3 | 2 |

These rubber compounds were formed into tapes 0.5 mm. thick, and then vulcanized with steam for 30 minutes at 150° C. The physical and electric properties of the vulcanized compounds are as follows.

| Compound | Physical properties | | Tan δ percent (room temperature) | Volume resistivity (Ω. cm.) | Dielectric strength (kv./mm.) |
|---|---|---|---|---|---|
| | Tensile strength kg./mm.² | Elongation, percent | | | |
| A | 0.75 | 950 | 0.30 | >1×10¹⁵ | 25.0 |
| B | 0.80 | 700 | 0.35 | >1×10¹⁵ | 25.0 |
| C | 0.50 | 550 | 1.00 | >1×10¹⁵ | 25.0 |
| D | 0.40 | 450 | 2.00 | >1×10¹⁵ | 25.0 |

The electric properties of the same vulcanized rubber compounds after standing in steam at 5 kg./cm.² pressure for one hour, or after being immersed for 60 days in water at 80° C. were as follows:

| Rubber compound | After standing for 1 hour in steam at 5 kg./cm.² pressure | | | After immersion for 60 days in 80° C. water | | |
|---|---|---|---|---|---|---|
| | Tan δ (percent) (room temperature) | Volume resistivity (Ω.cm.) | Dielectric strength (kv./mm.) | Tan δ (percent) (room temperature) | Volume resistivity (Ω.cm.) | Dielectric strength (kv./mm.) |
| A | 0.35 | >1×10¹⁵ | 25.0 | 0.32 | >1×10¹⁵ | 25.0 |
| B | 0.35 | >1×10¹⁵ | 25.0 | 0.54 | >1×10¹⁵ | 25.0 |
| C | Above 10 | 5.5×10¹³ | 18.0 | Above 10 | 4.0×10¹³ | 15.0 |
| D | Above 10 | 4.5×10¹³ | 19.0 | Above 10 | 3.0×10¹³ | 13.0 |

It is thus seen that the rubber compounds having the compositions A and B, which contain as a filler calcium carbonate whose surface has been treated with stearic acid, suffer no substantial decline in their electric properties even after standing in steam or immersion in hot water, and hence that dielectric breakdown do not readily occur in steam or water. By contrast, the rubber compounds C and D containing as fillers respectively light and heavy calcium carbonates, suffered a pronounced decrease in electric properties under the same conditions, even though immediately after vulcanization their electric properties were nearly as good as those of the rubber compounds A and B.

EXAMPLE 2

Rubber compounds having the following compositions were prepared.

| Rubber compound | Compounding ingredients | | | | | | |
|---|---|---|---|---|---|---|---|
| | Butyl rubber | Zinc white | Paraffin | Filler | Sulphur | Tetramethyl-thiuramdi-sulphide | Mercaptoben-zothiazole |
| E | 100 | 5 | 2 | Rosin acids surface-treated calcium carbonate, 70. | 2 | 2 | 1 |
| F | 100 | 5 | 2 | Rosin acids surface-treated calcium carbonate, 150. | 2 | 2 | 1 |
| G | 100 | 5 | 2 | Calcined clay, 100 | 2 | 2 | 1 |
| H | 100 | 5 | 2 | Talc, 100 | 2 | 2 | 1 |
| I | 100 | 5 | 2 | Hydrous silicic acid, 100 | 2 | 2 | 1 |

These rubber compounds were formed into tapes 0.5 mm. thick, and then steam vulcanized for 30 minutes at 150° C. The physical and electric properties of the vulcanized rubbers were as follows:

| Rubber compound | Mechanical Properties | | Electric Properties | | |
|---|---|---|---|---|---|
| | Tensile strength (kg./mm.²) | Elongation (percent) | Tan δ (percent) (room temperature) | Volume Resistivity (Ω. cm.) | Dielectric strength (kv./mm.) |
| E | 0.80 | 950 | 0.31 | >1×10¹⁵ | 25.0 |
| F | 0.90 | 800 | 0.40 | >1×10¹⁵ | 25.0 |
| G | 0.55 | 500 | 5.0 | 5×10¹³ | 25.0 |
| H | 0.75 | 800 | Above 10 | 1×10¹³ | 25.0 |
| I | 1.20 | 500 | Above 10 | 1×10¹⁰ | 18.0 |

After these vulcanized rubbers had stood for one hour in steam at 5 kg./cm.², or had been immersed for 60 days in water at 80° C., the results obtained were as follows:

| Rubber Compound | After standing for 1 hour in steam at 5 kg./cm.² pressure | | | After immersion for 60 days in 80° C. water | | |
|---|---|---|---|---|---|---|
| | Tan δ (percent) (room temperature) | Volume Resistivity (Ω. cm.) | Dielectric Strength (kv./mm.) | Tan δ (percent) (room temperature) | Volume resistivity (Ω.cm.) | Dielectric Strength (kv./mm.) |
| E | 0.35 | 1×10¹⁵ | 25.0 | 0.35 | >1×10¹⁵ | 25.0 |
| F | 0.45 | 1×10¹⁵ | 25.0 | 0.43 | >1×10¹⁵ | 25.0 |
| G | Above 10 | 5×10¹² | 20.0 | Above 10 | 3×10¹² | 19.0 |
| H | Above 10 | 4×10¹² | 18.0 | Above 10 | 3×10¹² | 18.0 |
| I | Above 10 | 1×10¹⁰ | 13.0 | Above 10 | 5×10⁹ | 11.0 |

It is evident from the foregoing results that the rubber compounds having the compositions E and F, which constitute the insulating layer in the cables of the invention, are outstandingly superior to the rubber compounds having the conventional compositions G, H and I, in their electric properties, particularly after standing in a steam atmosphere or immersion in hot water.

I claim:

1. A butyl rubber-insulated electric cable having as an insulating layer therefor a butyl rubber composition containing finely divided calcium carbonate in an amount of 70–150% by weight of the butyl rubber, the calcium carbonate being coated with 0.05–5% by weight, based on the weight of the calcium carbonate, of a coating layer obtained by blowing carbon dioxide into a mixture of lime milk and a member selected from the group consisting of hydrophobic fatty acids and the sodium, potassium and calcium salts thereof.

2. An electric cable according to claim 1 wherein said butyl rubber composition contains finely divided calcium carbonate whose surface has been coated with a member selected from the group consisting of the sodium, potassium and calcium salts of higher aliphatic monocarboxylic acids.

3. An electric cable according to claim 2, wherein the higher aliphatic monocarboxylic acid is selected from the group consisting of rosin, palmitic, stearic and oleic acids.

4. A method of manufacturing a butyl rubber-insulated electric cable, which comprises coating conductors, or conductors which have previously been coated with a semiconductive layer, with a vulcanizable butyl rubber composition containing finely divided calcium carbonate in an amount of 70–150% by weight of the butyl rubber, the calcium carbonate being coated with 0.05–5% by weight, based on the weight of the calcium carbonate, of a coating layer obtained by blowing carbon dioxide into a mixture of lime milk and a member selected from the group consisting of hydrophobic fatty acids and the sodium, potassium and calcium salts thereof, and vulcanizing the butyl rubber composition.

References Cited

UNITED STATES PATENTS

| | | | |
|---|---|---|---|
| 2,312,024 | 2/1943 | Brown | 117—232 |
| 2,658,014 | 11/1953 | Morrison | 174—110 |
| 2,830,919 | 4/1958 | Schatzel | 117—232 |
| 2,927,091 | 3/1960 | Liggett | 260—27 |
| 3,113,934 | 12/1963 | Grossman | 117—232 |
| 3,160,598 | 12/1964 | Delfosse. | |
| 3,362,924 | 1/1968 | Eastman | 117—232 |

WILLIAM D. MARTIN, Primary Examiner
R. M. SPEER, Assistant Examiner

U.S. Cl. X.R.
117—100, 232; 174—110